(12) United States Patent
Maruoka et al.

(10) Patent No.: US 7,387,146 B2
(45) Date of Patent: Jun. 17, 2008

(54) HEAVY DUTY TIRE

(75) Inventors: Kiyohito Maruoka, Kobe (JP); Minoru Nishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 35 days.

(21) Appl. No.: 11/363,207

(22) Filed: Feb. 28, 2006

(65) Prior Publication Data

US 2006/0249238 A1 Nov. 9, 2006

(30) Foreign Application Priority Data

May 9, 2005 (JP) ............................. 2005-136395

(51) Int. Cl.
*B60C 15/00* (2006.01)
*B60C 15/06* (2006.01)

(52) U.S. Cl. ...................... 152/539; 152/541; 152/543; 152/546; 152/547; 152/552; 152/554

(58) Field of Classification Search ................ 152/539, 152/541, 543, 546, 547, 552, 554

See application file for complete search history.

(56) References Cited

U.S. PATENT DOCUMENTS 6,736,177 B2   5/2004   Ueyoko

FOREIGN PATENT DOCUMENTS

| JP | 64-36509 | * | 2/1989 |
| JP | 2001-191754 | * | 7/2001 |
| JP | 2002-67628 | * | 3/2002 |
| JP | 2003-104016 | * | 4/2003 |

* cited by examiner

*Primary Examiner*—Justin Fischer
(74) *Attorney, Agent, or Firm*—Birch, Stewart, Kolasch & Birch, LLP

(57) ABSTRACT

A heavy duty tire including bead portions each with a bead core, and a carcass ply containing a main portion extending between bead portions and a pair of edge portions wound around the bead cores, the wound edge portion including a turnback part extending axially inwardly from a position on the axially outside of the bead core and an auxiliary cord layer disposed on the radially outside of the turnback part, whereby the end of the turnback part is positioned at a distance of from 2.0 to 8.0 mm from the radially outer surface of the bead core. In a normally inflated unloaded state of the tire, the turnback part is curved such that the diameter of the turnback part decreases continuously from the end to the position in the axial outside of the bead core.

12 Claims, 7 Drawing Sheets

HEAVY DUTY TIRE

The present invention relates to a pneumatic tire, more particularly to a bead structure for a heavy duty tire capable of improving bead durability.

In U.S. Pat. No. 6,736,177 cognate to the Japanese patent No. 3441720 (Publication No. 2002-59716), a heavy duty tire is disclosed, wherein a carcass ply has edge portions each secured to a bead core in each bead portion. In the bead portion Bd, as shown in FIG. 9, the carcass ply edge portion Ce is winded around the bead core Bc tightly, substantially contacting with the bead core. And the edge Ed which is folded back onto the radially outside of the bead core Bc is secured by a reinforcing cord layer Rl disposed on the radially outside thereof. For the reinforcing cord layer Rl, a heat-shrinkable cord such as nylon fiber cords is preferred to non heat-shrinkable cords such as steel cords in order to tighten the reinforcing cord layer Rl.

In this structure, therefore, there is a possibility that the winded edge portion Ce is bent at a steep angle along the corners of the bead core Bc. In the case of steel carcass cords especially, as the cord is made up of a plurality of filaments or strands twisted, if the cord is bent at a steep angle, the cord has a possibility of decreasing the strength, and further the filaments are very liable to become loosed during making a raw tire. As a result, there is a possibility that the durability of the bead portion is decreased during used under severe service conditions.

It is therefore, an object of the present invention to provide a heavy duty tire, in which the cords in the carcass ply winded portion around the bead core is prevented from decreasing in the strength and the bead durability can be improved.

According to the present invention, a heavy duty tire comprises a tread portion, a pair of sidewall portions, a pair of bead portions each with a bead core therein, and a carcass ply of cords extending between the bead portions, wherein the carcass ply comprises a main portion extending between the bead portions through the tread portion and sidewall portions and a pair of edge portions winded around the bead cores from the axially inside to the axially outside of the tire, the winded edge portion comprises a turnback part extending from a position on the axially outside of the bead core radially outwardly while getting away from a radial outer surface of the bead core and axially inwardly towards the main portion to terminate before the main portion, and on the radially outside of the turnback part, an auxiliary cord layer for positioning the turnback part is disposed, whereby the end of the turnback part is positioned at a distance of from 2.0 to 8.0 mm from the radially outer surface of the bead core.

An embodiment of the present invention will now be described in detail in conjunction with the accompanying drawings.

Figure 1:
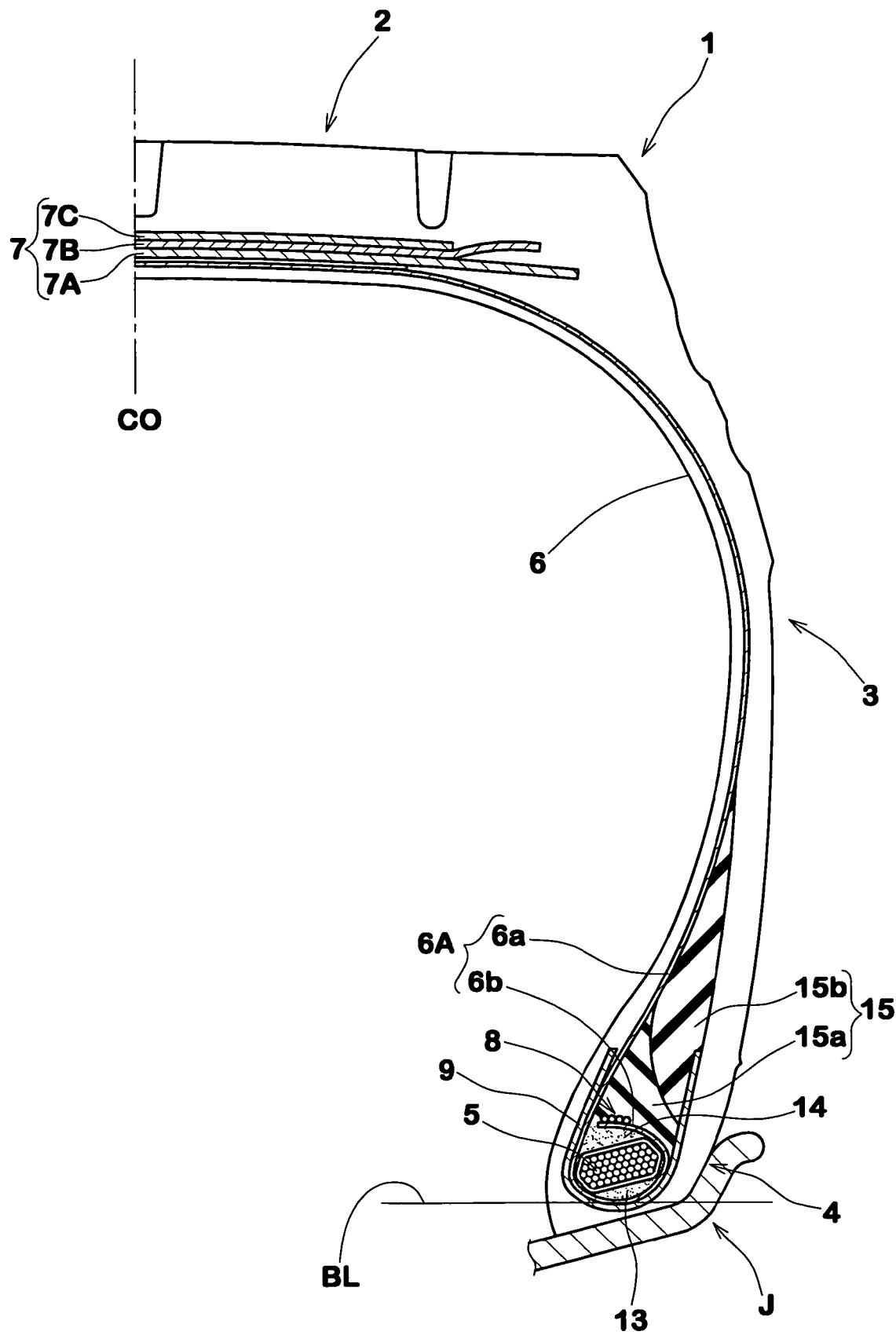
FIG. 1 is a cross sectional view of a heavy duty tire according to the present invention.

In the drawings, heavy duty tire 1 according to the present invention comprises: a tread portion 2; a pair of axially spaced bead portions 4 each with a bead core 5 therein; a pair of sidewall portions 3 extending between the tread edges and the bead portions; a carcass 6 extending between the bead portions; and a belt 7 disposed radially outside the carcass 6 in the tread portion 2.

FIG. 1 shows the normally inflated unloaded state of the tire. Here, the normally inflated unloaded state is such that the tire is mounted on a wheel rim J and inflate to a standard pressure but loaded with no tire load.

The wheel rim J comprises a pair of bead seats Js for the bead portions 4, a flange Jf extending radially outwardly from the axially outer end of each bead seat Js, and a rim well (not shown) for tire mounting formed between the bead seats Js. The wheel rim J may be a standard wheel rim, namely, a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Airpressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In the following embodiment, the heavy duty tire 1 is a tubeless radial tire to be mounted on a 15-degree-taper center-drop rim, wherein each of the bead seats Js is tapered axially inwards at 15 degrees. Accordingly, the bottom 4b of the bead portion 4 is also inclined at almost 15 degrees, more accurately 15 degrees or slightly larger.

In the tread portion 2, the belt 7 is disposed on the radially outside of the crown portion of the carcass 6.

The belt 7 is composed of at least two cross plies 7B and 7C, in this example three plies 7A, 7B and 7C, each made of steel cords laid parallel with each other. The cords of the radially innermost first ply 7A are laid at an angle of 45 to 75 degrees with respect to the tire equator CO. The cords of the radially outer second and third plies, namely, cross plies 7B and 7C are laid at a relatively small angle of 10 to 35 degrees with respect to the tire equator CO.

The carcass 6 is composed of at least one ply 6A of cords arranged radially at an angle in the range of from 80 to 90 degrees with respect to the tire equator CO, extending between the bead portions 4 through the tread portion 2 and sidewall portions 3. The carcass ply 6A is winded around the bead core 5 in each bead portion 4 from the axially inside to the axially outside of the tire to form a pair of winded portions 6b and a main portion 6a there between.

As the carcass cords, steel cords are used. But, organic fiber cords, e.g. polyester, aromatic polyamide, rayon, nylon and the like may be used in combination.

The carcass cords are rubberized with a topping rubber tg to improve adhesion between the carcass cords and adjacent rubber. In the case of the steel carcass cords 6C, preferably used as the topping rubber tg therefore is a relatively soft rubber compound having a complex elastic modulus of less than 20 MPa, more preferably less than 11 MPa, but not less than 7 MPa and being superior in adhesion to natural rubber or similar.

In this embodiment, the carcass 6 is composed of a single ply 6A of steel cords 6C arranged radially at an angle of 90 degrees with respect to the tire equator CO.

In the tread portion 2, a tread rubber is disposed on the radially outside of the belt 7, and the tread surface is defined by the tread rubber. In the sidewall portion 3, a sidewall rubber is disposed on the axially outside of the carcass 6, defining the sidewall surface. In the bead portion 4, a bead rubber is disposed along the bead bottom 4b between the bead toe and bead heel and extends axially outwards from the bead toe and bead heel. On the axially outer surface of the tire, the bead rubber extends beyond the contact point with the rim flange Jf and spliced with the sidewall rubber on the axially outside of the undermentioned bead filler 15.

In each of the bead portions 4, the bead core 5 is disposed to increase the engagement between the bead portions 4 and wheel rim J.

The bead core 5 is formed by orderly winding a steel wire 5w having a circular cross sectional shape. Thus, the bead core 5 is made up of a large number of windings of a single steel wire 5w. In a tire meridian section, namely, a cross section including the rotational axis of the tire, the contour line or cross sectional shape of the bead core 5 is elongated in a direction (Id) parallel to the bead seat Js which direction is the substantially same as the inclination of the bead bottom 4b. In this example, the number of windings of the steel wire 5w in each layer is 9, 10, 11, 10 and 9 from the radially inside to the outside. The bead core 5 has a hexagonal cross sectional shape which has a radially inner side and a radially outer side which are substantially parallel with the above-mentioned inclining direction (Id) and define the radial inner face SL and radial outer face SU of the bead core 5, respectively. Further, the hexagonal cross sectional shape has two sides on the axially inside which define the axially inner face Si of the bead core 5, and two sides on the axially outside which define the axially outer face So of the bead core 5.

As the bead seats Js are inclined at 15 degrees with respect to the tire axial direction, the radially inner face SL and outer face SU of the bead core 5 are inclined at approximately 15 degrees (about 13 degrees to 17 degrees) with respect to the tire axial direction. Generally speaking, the radially inner face SL is inclined at an angle between the inclination angle of the bead seat −2 degrees and the inclination angle of the bead seat +2 degrees.

To provide a uniform binding force across the bead bottom width and to prevent the lifting of the bead toe, the aspect ratio (Hc/Wc) between the maximum width Wc measured in the above-mentioned inclining direction (Id) and the maximum height Hc measured perpendicularly thereto is preferably set in a range of not less than 0.43, more preferably more than 0.45, but not more than 0.58, more preferably less than 0.56.

This however not necessarily mean that the cross sectional shape is limited to such a hexagonal shape. For example, a rectangle, oval or the like being long in the direction (Id) as well as a regular hexagon, circular form etc. may be used too.

The bead core 5 in this example is wrapped with a wrapping material 12. The wrapping material 12 helps to retain the cross sectional shape of the bead core and also prevent a direct contact between the bead wire and the carcass cords 6C to prevent their fretting wear. For those purpose, for example, a strip or tape of rubberized woven or nonwoven organic fiber fabric is preferably used, and it is winded around the bead core to completely cover the surface of the bead core.

The above-mentioned carcass ply 6A is made up of a toroidal main portion 6a extending between the bead cores 5 and a pair of winded portions 6b winded around the bead cores 5 from the axially inside to the axially outside of the tire.

The winded portion 6b has a base part 10 and a turnback part 11.

The base part 10 is curved in an arc along the above-mentioned faces Si, SL and So of the bead core 5. Therefore, between the base part 10 and the radially inner face SL, a certain space of a crescent sectional shape is formed, and in this space the undermentioned anchor rubber 13 is disposed.

The turnback part 11 extends radially outwards from the axially outer end of the base part 10 at a position P0, and extends axially inwardly towards the carcass ply main portion 6a, but terminates before the carcass ply main portion 6a not to contact therewith. The gap U2 between the end 11e thereof and the carcass ply main portion 6a is preferably set in a range of from 1 to 5 mm (cord to cord distance). If the distance U2 is less than 1 mm, it is difficult for the rubber between the main portion 6a and the end 11e to absorb the movement of the end 11e and mitigate the stress at the end 11e. If the distance U2 is more than 5 mm, the force to secure the turnback part 11 to the bead core 5 becomes insufficient.

In order that the carcass cords 6C in the winded portion 6b are not bent at a steep angle and to place the end 11e of the turnback part 11 within a region where deformations during running is small, the distance U1 of the end 11e from the bead core 5 (not from the wrapping material 12) is set in a range of not less than 2.0 mm, preferably more than 3.0 mm, more preferably more than 4.0 mm, but not more than 8.0 mm more preferably less than 7.0 mm. The distance U1 is the minimum distance which in this embodiment occurs when measured perpendicularly to the radially outer surface SU of the bead core. If the distance U1 is less than 2.0 mm, the springback of the turnback part 11 becomes strong, and it is difficult to prevent the formation of small cavity between the turnback part 11 and adjacent rubber. If the distance U1 is more than 8.0 mm, the securing of the winded portion 6b to the bead core 5 tends to become insufficient, and a carcass cord separation tends to occur starting from the carcass ply end 11e and the carcass ply tends to cause a blowout.

Figure 3:
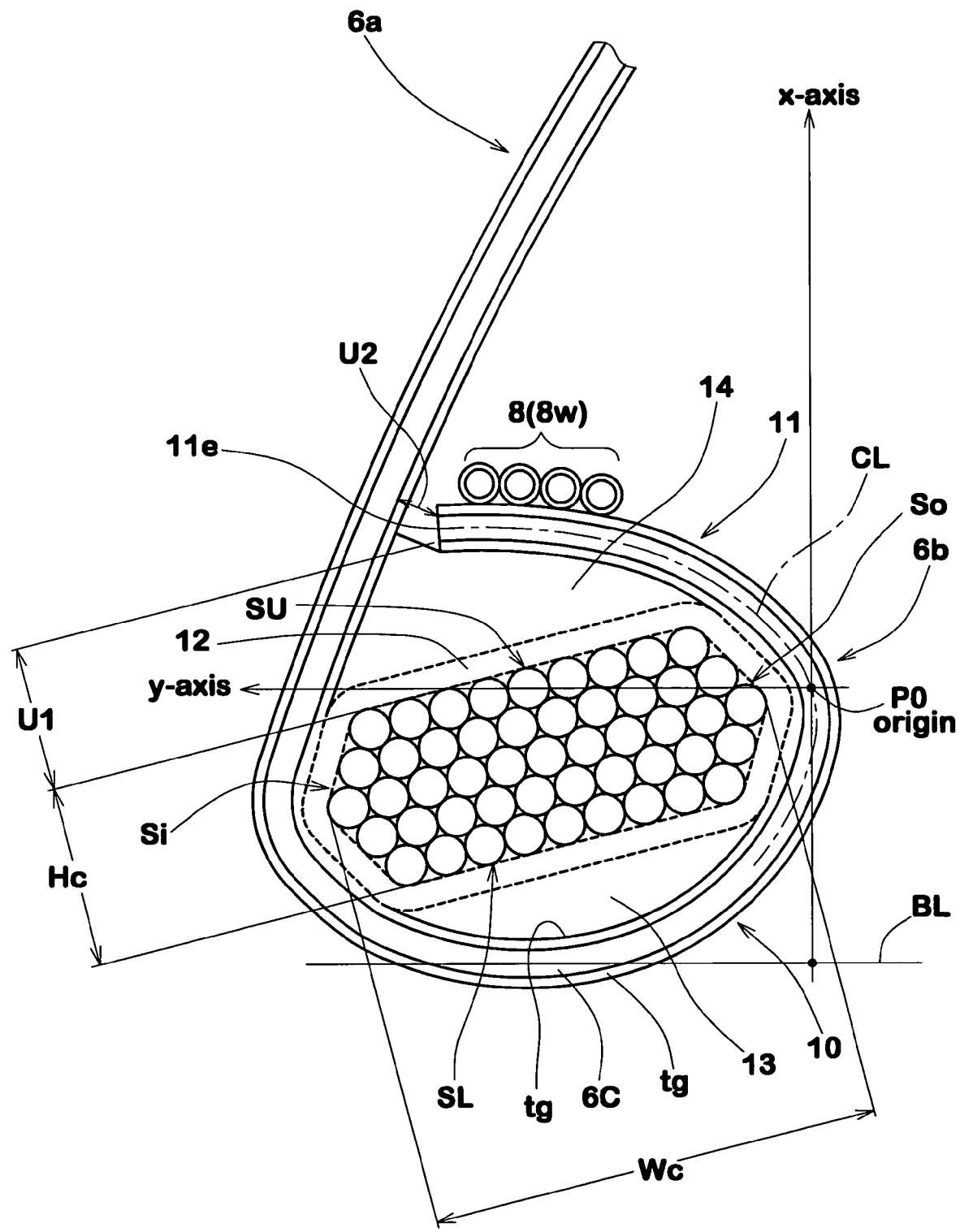
FIG. 3 is a schematic enlarged cross sectional view showing an arrangement of a bead core, a carcass ply winded portion and an auxiliary cord layer thereof.

As shown in FIG. 3, the space of a generally triangular cross sectional shape surrounded by the carcass ply main portion 6a, turnback part 11 and the bead core 5, is filled with a bead apex 14. In order to mitigate stress and shock at the end 11e of the turnback part 11, the bead apex 14 is made of a low-modulus rubber having a complex elastic modulus E*a of not less than 5 MPa, preferably more than 6 MPa, more preferably more than 7 MPa, but not more than 15 MPa, preferably less than 13 MPa, more preferably less than 11 MPa. If the complex elastic modulus E*a is less than 5 MPa, the movement of the turnback end 11e during running rather increases. If the complex elastic modulus E*a is more than 15 MPa, as the bead apex 14 becomes hard, when the main portion 6a is deformed to lean axially outwards during running, the bead apex 14 tends to rotate or deform the bead core 5.

In this invention, on the radially outside of the turnback part 11, an auxiliary cord layer 8 is disposed. The role of the auxiliary cord layer 8 is to position the turnback part 11, more specifically to place the end 11e at the above-mentioned distance U1 accurately and to control the curvature of the turnback part 11.

Figure 6:
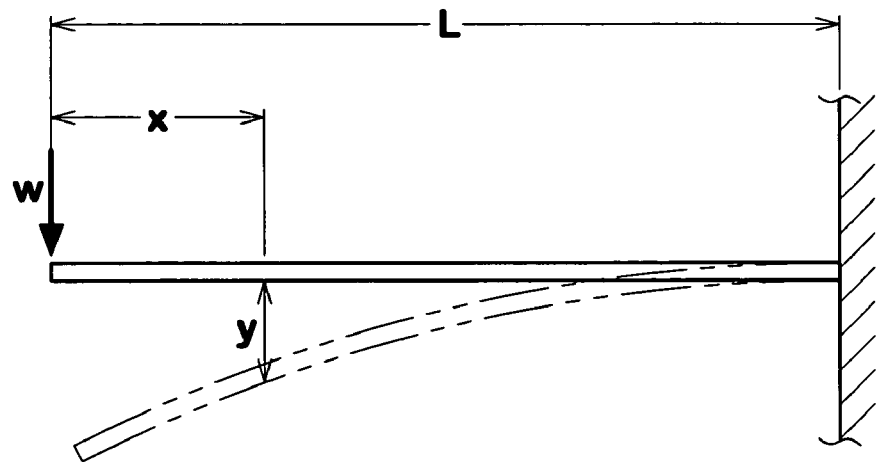
FIG. 6 is a diagram for explaining deflection of a cantilever beam.

In the meanwhile, as shown in FIG. 6, when a load is applied to the free end of a cantilever beam, the amount y of deflection at a distance x from the free end can be obtained from the following cubic function of the distance x:

$$y = W \times (x^3 - 3L^2 x + 2L^3)/6EI$$

wherein

L is the span of the beam,
W is the load on the free end,
E is a Young's modulus of the beam,
I is the geometrical moment of inertia of the beam.

When a cantilever beam is deflected along a cubic curve defined by this cubic function, the stress occurring in the beam can be minimized.

In the case of the carcass cord 6C, as shown in FIG. 3, a part between the outer end 11e and position P0 is treated as a cantilever beam fixed at the position P0 and having the outer end 11e as the free end, wherein the position P0 is such that the distance between the carcass cord 6C and the axially outermost end of the bead core 5 becomes minimum under the normally inflated unloaded state of the tire.

This part between 11e and P0, namely, the turnback part 11 is curved so that the center line CL of the carcass cord 6C becomes an approximated curve to the cubic curve thereby the stress of the carcass cords 6C in the turnback part 11 can be minimized. More specifically, in the tire meridian section under the normally inflated unloaded state of the tire, when a X-Y coordinate is defined such that the origin is the position P0, the x-axis is parallel to the tire radial direction, and the y-axis is parallel to the tire axial direction as shown in FIG. 3, the center line CL of the cord 6C is curved along a cubic curve defined by $$y = W \times (x^3 - 3L^2 x + 2L^3)/6EI$$

This is ideal, but realistically, a tolerance on y, of at most plus/minus 1 mm (preferably 0.5 mm) may be allowed.

In other words, the center line CL is curved so as to remain between the cubic curve shifted by +1 mm (preferably +0.5 mm) in the y-axis direction and the cubic curve shifted by −1 mm (preferably −0.5 mm) in the y-axis direction.

Therefore, the decrease in the strength of the carcass cords due to bending stress can be effectively prevented.

Figure 4:
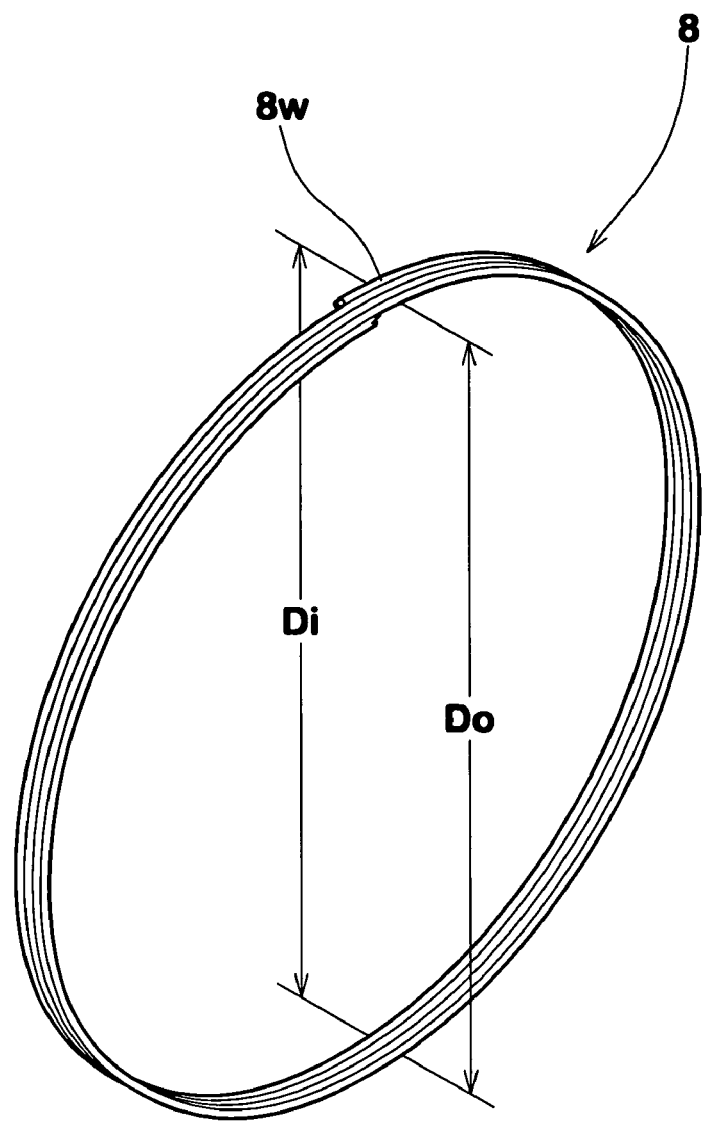
FIG. 4 is a perspective view of the auxiliary cord layer.
Figure 5:
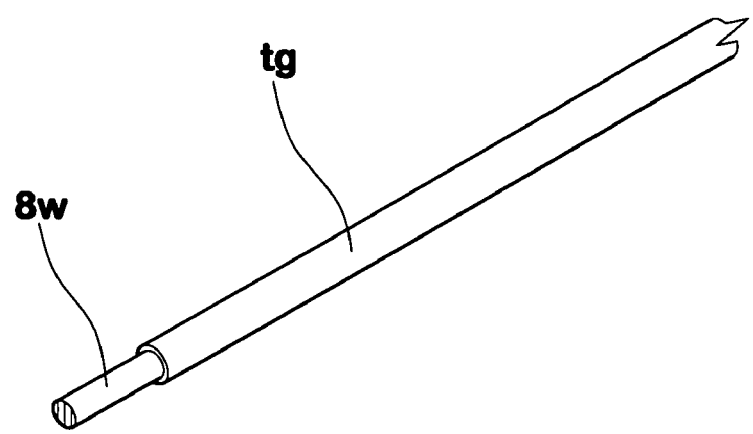
FIG. 5 is a perspective view of a steel cord of the auxiliary cord layer.

In order to control the curvature of the turnback part 11 as above, the auxiliary cord layer 8 is formed by winding a single steel cord 8w at least one turn, preferably two to ten turns in a form of spiral coil as shown in FIG. 4 and FIG. 5.

The auxiliary cord layer 8 has to position the turnback part 11 in place against its strong springback force.

If the auxiliary cord layer 8 is made of organic fiber cords, due to high pressure and heat during tire vulcanization and the strong springback force, the organic fiber cords are stretched and it is difficult to adjust the curvature of the turnback part 11 accurately to the designed curvature. Therefore, a steel cord (inclusive of a single wire) is used.

In order to prevent the steel cord 8w from contacting directly to the carcass cords to thereby avoid fretting wear, the auxiliary cord layer 8 is rubberized with a topping rubber tg in a form of an aggregation of windings or in a form of a single cord. Preferably, a rubber coated single steel cord or wire as shown in FIG. 5(A) is used.

If the strength of an individual steel cord 8w is less than 1300 N, in order to obtain a necessary overall strength of the cord layer 8, it becomes necessary to provide a large number of windings and the production efficiency and dimensional accuracy are liable to deteriorate. If the strength is more than 3500 N, the steel cord 8w becomes rigid and it becomes difficult to wind it around the turnback part 11. Therefore, the strength of the steel cord 8w is preferably not less than 1300 Newton more preferably more than 2000 Newton, but not more than 3500 Newton more preferably less than 3000 Newton.

As best shown in FIG. 3, the properly controlled turnback part 11 is curved progressively decreasing the outer diameter towards the axially outside. Therefore, in order that the auxiliary cord layer 8 fits to the turnback part 11, a single cord 8w is spirally winded with gradually decreasing the winding diameter from the axially innermost winding (dia. Di) to the axially outermost winding (dia. Do) forming a single layer of windings, rather than a tape of rubber in which a plurality of cords are previously embedded in parallel with each other along the length thereof. To provide constant cord spacings, the cord 8w is winded compactly so that the topping rubber coatings of the windings contact with each other.

Figure 8:
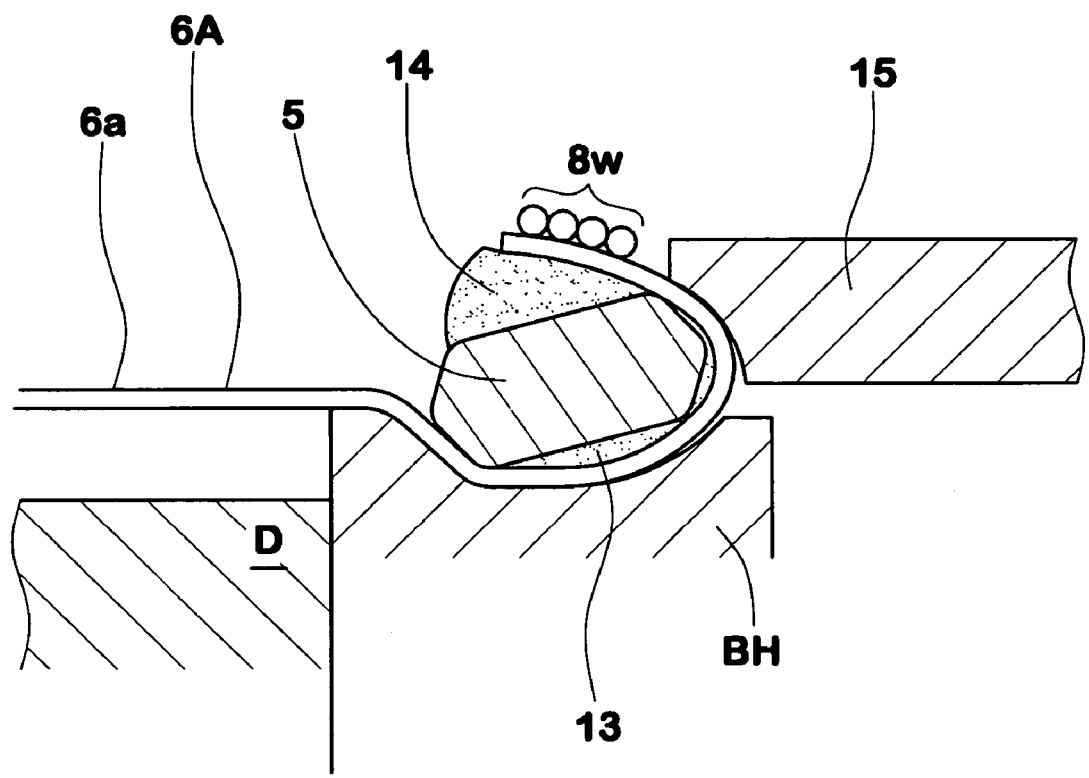
FIG. 8 is a diagram for explaining a method of winding the auxiliary cord layer.
Figure 9:
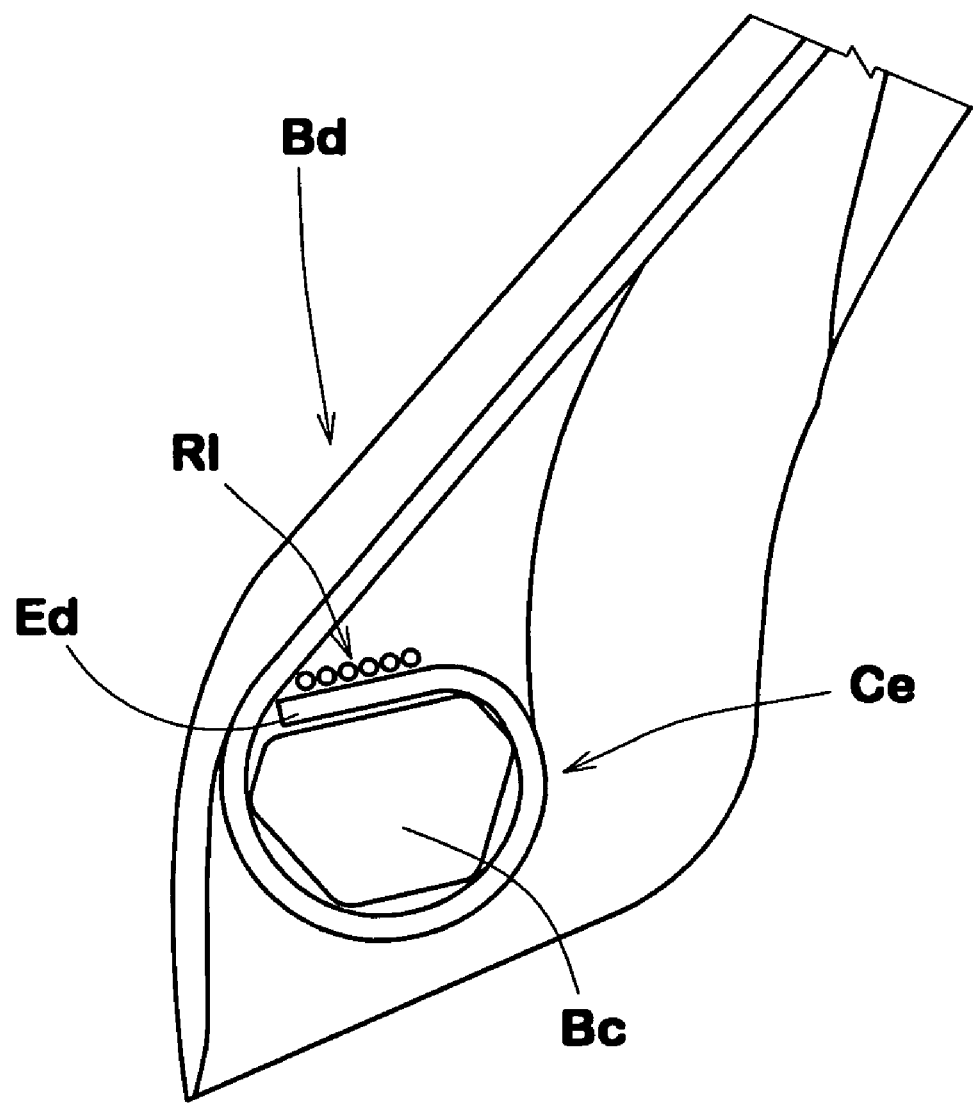
FIG. 9 is a schematic cross sectional view of a bead portion according to the prior art.

FIG. 8 shows a stage of building a raw tire, wherein the bead core 5 formed separately is disposed around the carcass ply 6A winded directly or indirectly on a cylindrical tire building drum D; the edge portion of the carcass ply 6A is held between the bead core 5 and a bead holder BH expanding or rising from the cylindrical surface of the tire building drum D against the bead core; the edge portion is turned back axially inwards against the springback force thereof; and while preventing the springback of the edge portion with a stopper 15 and a guide roller (not shown), a rubber coated steel cord 8w is winded directly on the radially outside of the folded edge portion, wherein the guide roller is movable in the radial direction to adjust the winding diameter of the cord to accord with the cubic curve and also movable in the axial direction in accordance with the helical advancement of the winded cord. Aside from this direct winding on the turnback part 11, the auxiliary cord layer 8 may be separately formed by winding a cord 8w around a profiled drum to be placed around the turnback part 11 thereafter.

In any case, in order to lessen the movement and displacement of the turnback part 11 during tire vulcanization, the value (N×F)/(MR×n) is preferably set in a range of not more than 0.20, more preferably 0.10, still more preferably 0.05, wherein "N" is the total number of the carcass cords 6C in the carcass ply 6A, "F" is a force (N) required to bend a carcass cord 6C by an angle of 15 degrees, "n" is the number of the winding(s) of the steel cord 8w of the auxiliary cord layer 8, and "MR" is tensile rigidity (Newton/cm) of the steel cord 8w of the auxiliary cord layer 8.

Figure 7:
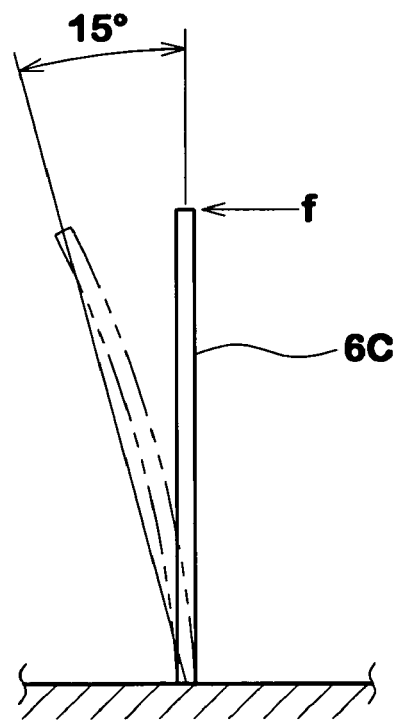
FIG. 7 is a diagram for explaining a definition of bending stiffness of a carcass cord.

Here, the force F is defined as follows and can be measured with a TABER Stiffness Tester Model 150-D for example. As shown in FIG. 7, a cord 6C having a free end is fixed at the other end at a distance of 5 cm from the free end, and a force f applied to the free end is gradually increased, and when the cord is bent by 15 degrees at the free end regarding the fixed end as the center, the value of the applied force is measured as "F" in Newton.

As the auxiliary cord layer 8 can prevent the springback of the turnback part 11 during making the raw tire and also in the finished tire, it is not necessary to perform the carcass cords which causes a large plastic deformation and therefore the decrease in the carcass cord strength resulting therefrom can be prevented to increase the bead durability.

In this embodiment, the bead portion 4 is further provided with a steel cord layer 9 made of steel cords inclined at an angle of from 10 to 40 degrees with respect to the tire circumferential direction.

In the tire meridian section, the steel cord layer 9 extends in a U-shape along the carcass ply 6A from the axially inside of the carcass ply main portion 6a to the axially outside of the winded portion 6b. So the steel cord layer 9 has a base portion 9b along the base part 10, an axially inner portion 9a and axially outer portion 9c. The axially inner portion 9a extends radially outwardly along the carcass ply main portion 6a. The axially outer portion 9c extends radially outwardly along the axially outside of the carcass ply winded portion 6b at first and then extends separating from the carcass ply.

These portions 9a and 9c extends radially outwardly into a lower sidewall portion beyond the radially outer end of the flange Jf of the rim J and also beyond the end 11e of the turnback part 11. Therefore, the steel cord layer 9 can disperse the heat transferred from the braking device of the vehicle through the wheel rim and also the heat generated in the bead portion itself. Thus the steel cord layer 9 functions as a thermal isolator or protector to improve the bead durability.

In this embodiment, furthermore, the above-mentioned bead filler 15 is disposed on the radially outside of the turnback part 11 and auxiliary cord layer 8.

The bead filler 15 extends along the axially outside of the carcass ply main portion 6a, while tapering towards its radially outer end. In this embodiment, the bead filler 15 includes a radially inner stiffener 15a having a complex elastic modulus $E^*b$ of from 20 to 60 MPa, and a radially outer buffer 15b having a complex elastic modulus $E^*c$ less than the complex elastic modulus $E^*b$. Preferably, the buffer 15b has a complex elastic modulus $E^*c$ in a range of not less than 3 MPa, preferably more than 3.5 MPa, but not more than 7 MPa, preferably less than 5 MPa. The above-mentioned complex elastic modulus $E^*b$ of the stiffener 15a is preferably set in a range of not less than 25 MPa, more preferably more than 30 MPa, but not more than 50 MPa, more preferably less than 40 MPa.

The bead filler 15 (stiffener 15a) contacts with the bead apex 14 through the above-mentioned gap U2, and they are merged. Thus, the turnback part 11 is secured between the stiffener 15a and bead apex 14.

The stiffener 15a extends radially outwardly along the carcass main portion 6a, and the radially outermost end resides on the axially outer surface of the main portion 6a. From this radially outermost end, the axially outer surface of the stiffener 15a extends radially inwardly in a concave curve to a position on the axially outer surface of the bead filler 15 which position locates at a radial height almost same as the end 11e of the turnback part 11. From this position the axially outer surface of the buffer 15b extends radially outwardly to the radially outer end, and between this radially outer end and the radially inner end, the axially inner surface of the buffer 15b extends, abutting on the axially outer surfaces of the main portion 6a and stiffener 15a. Therefore, the buffer 15b has a streamlined cross-sectional shape.

As the stiffener 15a extends between the axially inner and outer portions 9a and 9c of the above-mentioned steel cord layer 9, the opening of the U-shape is closes by the stiffener 15a, and the winded portion 6b is packed around the bead core and the pullout resistance of the carcass ply can be effectively improved.

If the complex elastic modulus $E^*b$ of the stiffener 15a is less than 20 MPa, the force to secure the turnback part 11 tends to become insufficient. If the complex elastic modulus $E^*b$ is more than 60 MPa, a stress concentration at the radially outer edge e2 of the axially outer portion 9c of the steel cord layer 9 increases and a separation failure tends to occur.

If the complex elastic modulus $E^*c$ of the buffer 15b is less than 3 MPa, a separation failure at the interface between the stiffener 15a tends to occur. If the complex elastic modulus $E^*c$ is more than 7 MPa, bending stress concentrates at the radially outer edge of the buffer 15b and damage is liable to occur, starting from such a point.

If the axially inner portion 9a and axially outer portion 9c are too high, unfavorable stress concentration occurs at their outer ends e1 and e2. Therefore, the height Hi of the radially outer end e1 of the axially inner portion 9a and the height Ho of the radially outer end e2 of the axially outer portion 9c are preferably not more than 230%, more preferably less than 210% of the radially outermost end of the bead core 5, each height measured radially from the bead base line BL.

However, it is preferable that the height Hi and height Ho are not less than 170%, more preferably not less than 200% of the height Hc, whereby the axially outwardly inclining motion of the carcass ply main portion 6a due to the applied tire loads can be controlled and thereby the stress acting on the end 11e of the turnback part 11 can be reduced.

Figure 2:
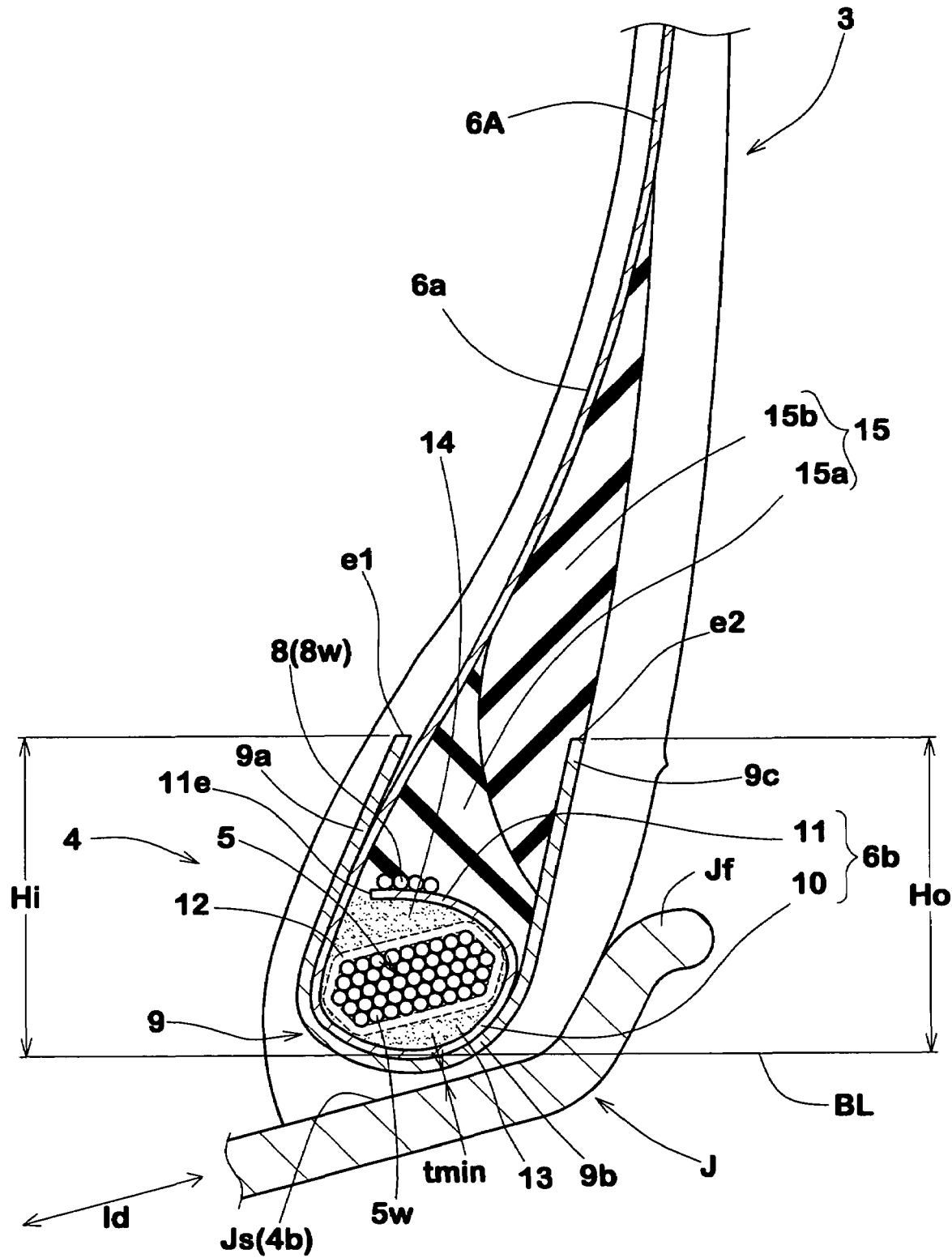
FIG. 2 is an enlarged cross sectional view of the bead portion thereof.

As described above, a sufficient pullout resistance of the carcass ply winded portion 6b is provided. But, a heavy duty tire is likely to be used under unexpectedly severe conditions. Thus, in order to increase the resistance furthermore, as shown in FIG. 2 and FIG. 3, the bead portion 4 is provided under the bead core 5 with an anchor rubber 13.

When the tire is mounted on the rim J, the anchor rubber 13 is relatively pressed by the bead core 5 toward the bead bottom 4b and presses the carcass cords 6C towards the bead bottom which is firmly supported by the bead seat Js of the wheel rim J, and thereby the carcass cords 6C in the base part 10 are tightly pinched and held between the anchor rubber 13 and the bead seat Js together with the steel cords in the base portion 9b. Thus, the anchor rubber 13 helps to secure the bead reinforcing layer 9 in place. For that purpose, the anchor rubber 13 has to have a complex elastic modulus of not less than 20 MPa, preferably more than 25 MPa, more preferably more than 28 MPa, still more preferably more than 30 MPa, but not more than 80 MPa, preferably less than 70 MPa, more preferably less than 65 MPa, still more preferably less than 60 MPa. If the complex elastic modulus is less than 20 MPa, the rubber becomes too soft and it is difficult to secure the cords. If more than 80 MPa, the formability of the rubber decreases.

The anchor rubber 13 is disposed in the space formed between the bead core 5 and the curved base part 10 of the carcass ply winded portion 6b. To be exact, in this embodiment, as the wrapping material 12 exists around the bead core 5 and the carcass cords are coated with the topping rubber tg, the space is formed between the wrapping material 12 and carcass topping rubber tg in actuality.

The anchor rubber 13 in this example is a single layer. But, the anchor rubber 13 may be a two or more layered structure. For example, the anchor rubber 13 may be made up of a radially outer layer 13a and a radially inner lower-modulus layer 13b arranged to substantially isolates the outer layer 13a from the topping rubber tg of the carcass cords 6C.

If the rubber thickness beneath the anchor rubber 13 is too large, the pinching force is decreased by the elastic deformation of the rubber. Therefore, the minimum distance tmin from the bead bottom 4b to the adjacent cords is set in a range of less than 2.0 mm preferably less than 1.5 mm but more than 0.3 mm. In this position, aside from the carcass cord topping rubber, the complex elastic modulus of the rubber is in the range of from 8 to 20 Mpa.

As descried above, in the heavy duty tire according to the present invention, as the winded portion of the carcass ply is not bent at a steep angle and curved along an minimal stress curve, the carcass cord strength is maintained and the bead durability can be effectively improved.

The invention claimed is:

1. A heavy duty tire comprising
a tread portion,
a pair of sidewall portions,
a pair of bead portions each with a bead core therein, and
a carcass ply of cords extending between the bead portions, the carcass ply comprising a main portion extending between the bead portions through the tread portion and sidewall portions and a pair of edge portions which wind around the bead cores from the axially inside to the axially outside of the tire, wherein
the wound edge portion comprises a turnback part extending from a position on the axially outside of the bead core, radially outwardly and away from a radial outer surface of the bead core, and axially inwardly towards the main portion, terminating before the main portion of the carcass, and
an auxiliary cord layer disposed on the radially outside of the turnback part,
whereby an end of the turnback part is positioned at a distance of from 2.0 to 8.0 mm from the radially outer surface of the bead core and wherein the turnback part is, in a tire meridian section, curved toward the radially outer surface while extending from said position on the axially outside of the bead core towards the carcass ply main portion,
a space defined by the turnback, part, the bead core, and the carcass ply main portion having a generally triangular cross sectional configuration, said space being filled with a bead apex made of a low-modulus rubber having a complex elastic modulus of not more than 15 MPa, and
an anchor rubber having a complex elastic modulus of not less than 20 MPa disposed in a space having a crescent sectional configuration and formed between the bead core and a base part of the carcass ply wound portion disposed under the bead core.

2. The heavy duty tire according to claim 1,
in a normally inflated unloaded state of the tire, wherein the turnback part is, in a meridian section of the tire, curved substantially along a cubic curve such that the diameter of the turnback part, taking its center as the tire rotational axis, decreases continuously from the end of the turnback part to the position on the axial outside of the bead core.

3. The heavy duty tire according to claim 1, wherein
the auxiliary cord layer is formed by winding a single steel cord a plurality of times, gradually decreasing the winding diameter from the axially innermost winding to the axially outermost winding.

4. The heavy duty tire according to claim 1, wherein
the auxiliary cord layer is formed by winding a single steel cord a plurality of times, gradually decreasing the winding diameter from the axially innermost winding to the axially outermost winding, and
the number of windings is at most 10.

5. The heavy duty tire according to claim 1, wherein
the auxiliary cord layer is formed by winding a single steel cord, and
the number of the windings is from 2 to 10.

6. The heavy duty tire according to claim 1, wherein
The total number of the carcass cords in the carcass ply, the force in Newtons required to bend a carcass cord by 15 degrees, the number of winding(s) of the steel cord in the auxiliary cord layer, and the tensile rigidity (Newton/cm) of a steel cord in the auxiliary cord layer satisfy the following condition:

$$(N \times F)/(MR \times n) \leq 0.20.$$

7. The heavy duty tire according to claim 6, wherein
the following condition is satisfied:

$$(N \times F)/(MR \times n) \leq 0.10.$$

8. The heavy duty tire according to claim 1, wherein
the strength of the steel cord in the auxiliary cord layer is 1300 to 3500 Newton.

9. The heavy duty tire according to claim 2, wherein
the auxiliary cord layer is formed by winding a single steel cord a plurality of times, gradually decreasing the winding diameter from the axially innermost winding to the axially outermost winding.

10. The heavy duty tire according to claim 2, wherein
the auxiliary cord layer is formed by winding a single steel cord a plurality of times, gradually decreasing the winding diameter from the axially innermost winding to the axially outermost winding, and
the number of the windings is at most 10.

11. The heavy duty tire according to claim 2, wherein
the auxiliary cord layer is formed by winding a single steel cord, and the number of the windings is from 2 to 10.

12. The heavy duty tire according to claim 1, wherein the anchor rubber is made up of a radially outer layer and a radially inner lower modulus layer arranged to substantially isolate the outer layer from a topping rubber of the carcass cords.

* * * * *